United States Patent
Alecu et al.

(10) Patent No.: US 12,234,768 B2
(45) Date of Patent: Feb. 25, 2025

(54) GAS TURBINE ENGINE OIL SCOOP WITH AIR SEPARATOR

(71) Applicant: Pratt & Whitney Canada Corp., Longueuil (CA)

(72) Inventors: Daniel Alecu, Brampton (CA); Dave Menheere, Norval (CA)

(73) Assignee: Pratt & Whitney Canada Corp., Longueuil (CA)

( * ) Notice: Subject to any disclaimer, the term of this patent is extended or adjusted under 35 U.S.C. 154(b) by 57 days.

(21) Appl. No.: 18/346,572

(22) Filed: Jul. 3, 2023

(65) Prior Publication Data

US 2025/0012217 A1    Jan. 9, 2025

(51) Int. Cl.
*F02C 7/06* (2006.01)
*F01D 25/18* (2006.01)

(52) U.S. Cl.
CPC .............. *F02C 7/06* (2013.01); *F01D 25/18* (2013.01); *F05D 2240/50* (2013.01); *F05D 2260/98* (2013.01)

(58) Field of Classification Search
CPC ........ F01D 25/18; F02C 7/06; F05D 2240/50; F05D 2240/63; F05D 2260/98
See application file for complete search history.

(56) References Cited

U.S. PATENT DOCUMENTS

| | | | |
|---|---|---|---|
| 4,453,784 A | 6/1984 | Kildea et al. | |
| 4,576,001 A | 3/1986 | Smith | |
| 7,124,857 B2 | 10/2006 | Gekht et al. | |
| 2006/0263202 A1* | 11/2006 | Dins | F16C 33/583 415/88 |
| 2016/0069186 A1* | 3/2016 | Mcdonagh | F16N 7/363 416/95 |
| 2023/0059943 A1* | 2/2023 | Quintin | F01D 5/026 |

* cited by examiner

*Primary Examiner* — Scott J Walthour
(74) *Attorney, Agent, or Firm* — Carlson, Gaskey & Olds, P.C.

(57) ABSTRACT

A gas turbine engine includes a turbine for driving a shaft to in turn drive a rotor. A combustor receives compressed air, and combusts the compressed air. The shaft is supported by at least one bearing. An oil delivery system is associated with the at least one bearing including an oil scoop rotating with the at least one shaft and a stationary oil jet provided with a source of lubricant. A mixed fluid chamber is within the shaft. The mixed fluid chamber is connected to an air exit. There further is an oil chamber radially outward of the mixed fluid chamber. The oil chamber is connected to the at least one bearing.

17 Claims, 4 Drawing Sheets

GAS TURBINE ENGINE OIL SCOOP WITH AIR SEPARATOR

BACKGROUND

This application relates to an improved oil scoop for a gas turbine engine shaft.

Gas turbine engines are known, and typically include a propulsor such as a propeller or fan delivering air as propulsion, and further delivering air to a compressor in a core engine. The air is compressed and delivered into a combustor where it is mixed with fuel and ignited. Products of this combustion pass downstream over turbine rotors, driving the turbine rotors to rotate. The turbine rotors in turn drive the propulsor and compressor.

Shafts connect the turbine rotors to the rotors they are driving. The shafts are supported in bearings. The bearings require lubrication.

One way of providing lubrication to a rotating shaft bearing is through an oil scoop. An oil scoop is an opening that rotates with the shaft. An oil jet is positioned adjacent the scoop and delivers oil towards the scoop. The scoop captures the oil and then routes it to the bearing.

SUMMARY

A gas turbine engine includes a turbine for driving a shaft to in turn drive a rotor. A combustor receives compressed air, and combusts the compressed air. The shaft is supported by at least one bearing. An oil delivery system is associated with the at least one bearing including an oil scoop rotating with the at least one shaft and a stationary oil jet provided with a source of lubricant. A mixed fluid chamber is within the shaft. The mixed fluid chamber is connected to an air exit. There further is an oil chamber radially outward of the mixed fluid chamber. The oil chamber is connected to the at least one bearing.

These and other features will be best understood from the following drawings and specification, the following is a brief description.

DETAILED DESCRIPTION

Figure 1:
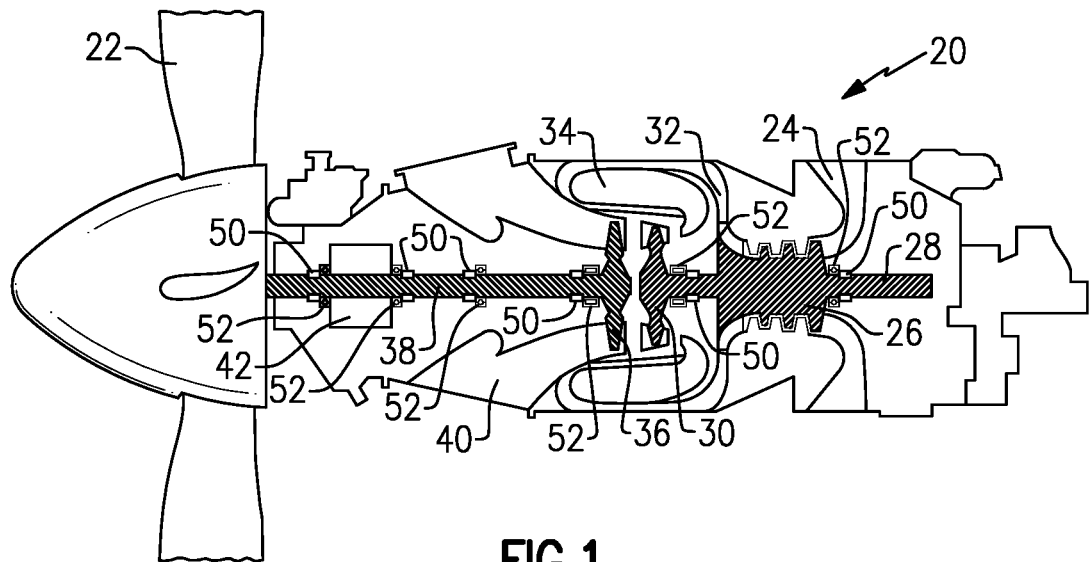
FIG. 1 schematically shows a gas turbine engine.

FIG. 1 shows a gas turbine engine 20 having a propulsor 22. The propulsor 22 is shown here as a propeller, however, the teachings of this disclosure would extend to other gas turbine engines including those having a fan. An air inlet 24 delivers air to a compressor 26. The compressor rotates with a shaft 28. The air compressed by the compressor 26 is delivered to an outlet 32 and then into a combustor 34. Combustor 34 mixes the compressed air with fuel and ignites the mixture. Products of this combustion pass downstream over a turbine rotor 30. As turbine rotor 30 is driven to rotate, it in turn rotates shaft 28 and the compressor 26.

Products of the combustion from combustor 34 also pass over a turbine rotor 36. Turbine rotor 36 drives a shaft 38, to in turn drive the propulsor 22. The products of combustion downstream of the turbine rotors 30 and 36 pass through an outlet 40.

A gear reduction 42 connects the shaft 38 to the propulsor 22 such that shaft 38 rotates at a higher speed than propulsor 22.

A plurality of oil scoops 50 are shown in the shafts 28 and 38. These are each adjacent a bearing 52. As can be appreciated, there are a plurality of bearings 52 supporting each of the shafts 28 and 38.

Figure 2:
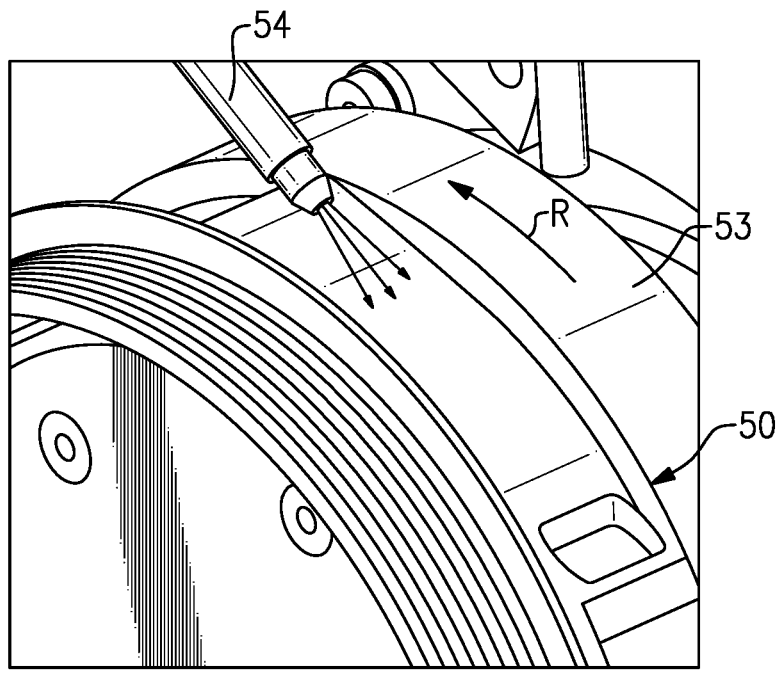
FIG. 2 shows an oil scoop.

FIG. 2 shows an oil scoop 50. Oil scoop 50 rotates with a shaft portion 53 in the direction R. An oil jet 54 is supplied with lubricant which is then jetted toward the rotating shaft portion 53 generally in an opposed direction to the direction R. Oil scoop 50 captures some of this lubricant.

Figure 3:
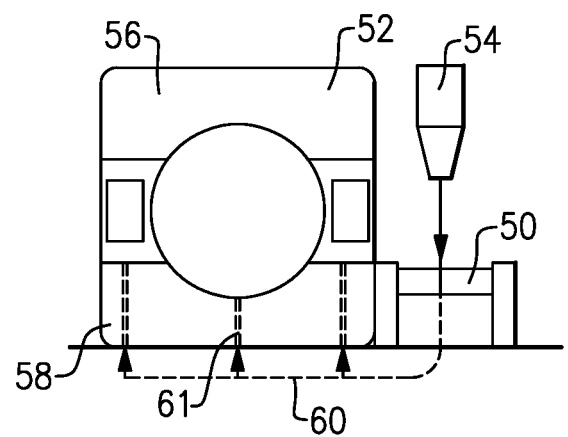
FIG. 3 schematically shows how an oil scoop delivers oil to a bearing.

FIG. 3 schematically shows how the scoop 50 delivers oil to a passage 60, and then into openings 61 in an inner race 58 of the bearing 52. An outer race 56 is fixed, as known.

Current oil scoops are not as efficient as would be desired. Applicant has recognized that a problem with the efficiency is that the lubricant becomes entrained with air forming a mist. The rotation of the scoop results in a vortex-like flow pattern around the shaft, with a low pressure on the shaft and rapidly increasing pressure away from the shaft. The speed of sound in an oil mist is much lower than the speed of sound in air. As such, the rotating member 53 may approach and even pass the speed of sound, resulting in bow shock, which effectively drives the oil and air mist away from entering the scoop 50.

Figure 4:
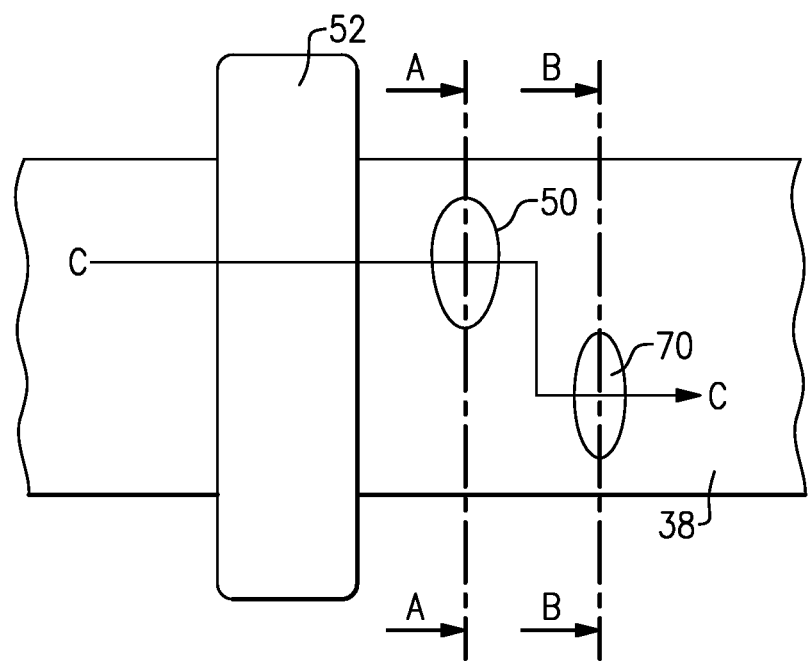
FIG. 4 shows an oil scoop along with an air outlet.

FIG. 4 shows an embodiment according to this disclosure wherein the shaft 38 has both the oil scoop 50 and an air exit scoop 70. As can be seen, they are spaced axially along the shaft 38. Bearing 52 is shown to be adjacent the scoop 50. Scoops 50 and 70 are also circumferentially spaced from each other.

Figure 5:
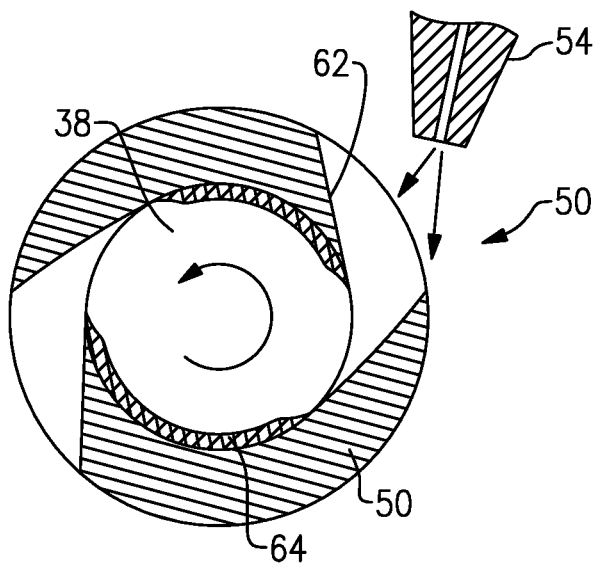
FIG. 5 is a cross-sectional view along line A-A of FIG. 4.

FIG. 5 shows the oil scoop 50 receiving the mixed oil and air from the oil jet 54. An opening chamber 62 is relatively large and converges to be smaller heading in a downstream radially inward direction toward chamber 64.

Figure 6:
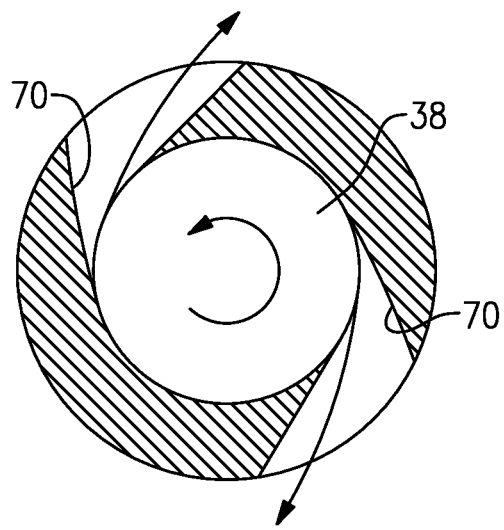
FIG. 6 is a cross-sectional view along line B-B of FIG. 4.

FIG. 6 shows the air exit scoop 70. As shown, the air exit scoops 70 are relatively small at a radially inner location and expand to be greater in area.

Figure 7:
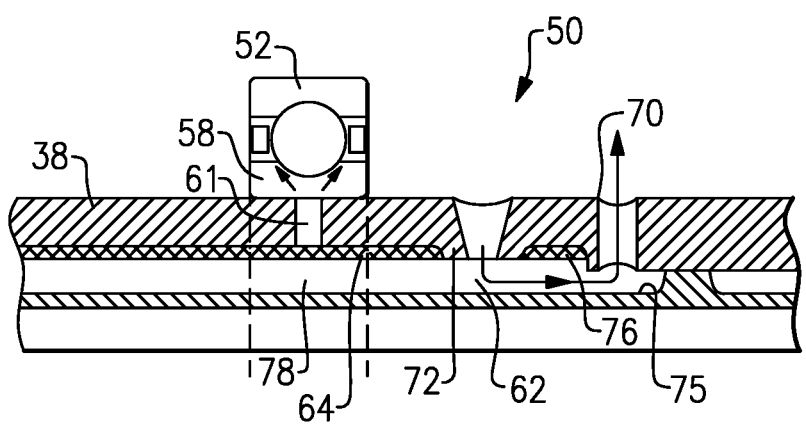
FIG. 7 is a cross-sectional view along line C-C of FIG. 4.

FIG. 7 shows both scoop 50 and scoop 70. The mixed air and oil enters the oil scoop 50. Oil scoop 50 has a cone like inner end 72. The air and oil mist passes into a mixed fluid chamber 62 and moves in a direction toward the air exit 70 due to the pressure outwardly of the exit 70. However, the oil is also rotating with the shaft 38 and an inner shaft tie rod 75. Thus, the lubricant will be thrown outwardly of the mist by centrifugal force, and can move into a chamber 76. Thus, the fluid leaving the exit 70 is relatively free of lubricant.

Tie rod 75 is radially inward of an inner peripheral surface of the shaft 38. The mixed fluid chamber 62 is defined between an inner peripheral surface of the shaft 38 and an outer peripheral surface of tie rod 75.

From chamber 76 the oil migrates into chamber 64, and then to the opening 6061 such that it can lubricate the inner race 58.

Since the air has been largely removed, the liquid reaching the bearing is much more oil rich than in the prior art.

Figure 8:
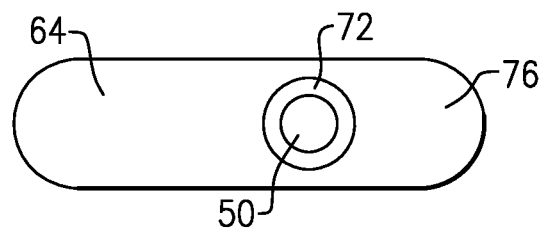
FIG. 8 shows a detail of a flow passage.

FIG. 8 shows the cone 72, the chamber 76 and the chamber 64. As can be appreciated, the oil can migrate from the chamber 76 to the chamber 64 around the cone 72.

Now, given the air being separated and leaving the exit 70, the oil and air mist is not driven away from the scoop 50, but is rather drawn into the scoop 50 and chamber 62.

In fact, the internal shock wave would occur in the chamber 62 of the oil scoop 50.

Figure 9:
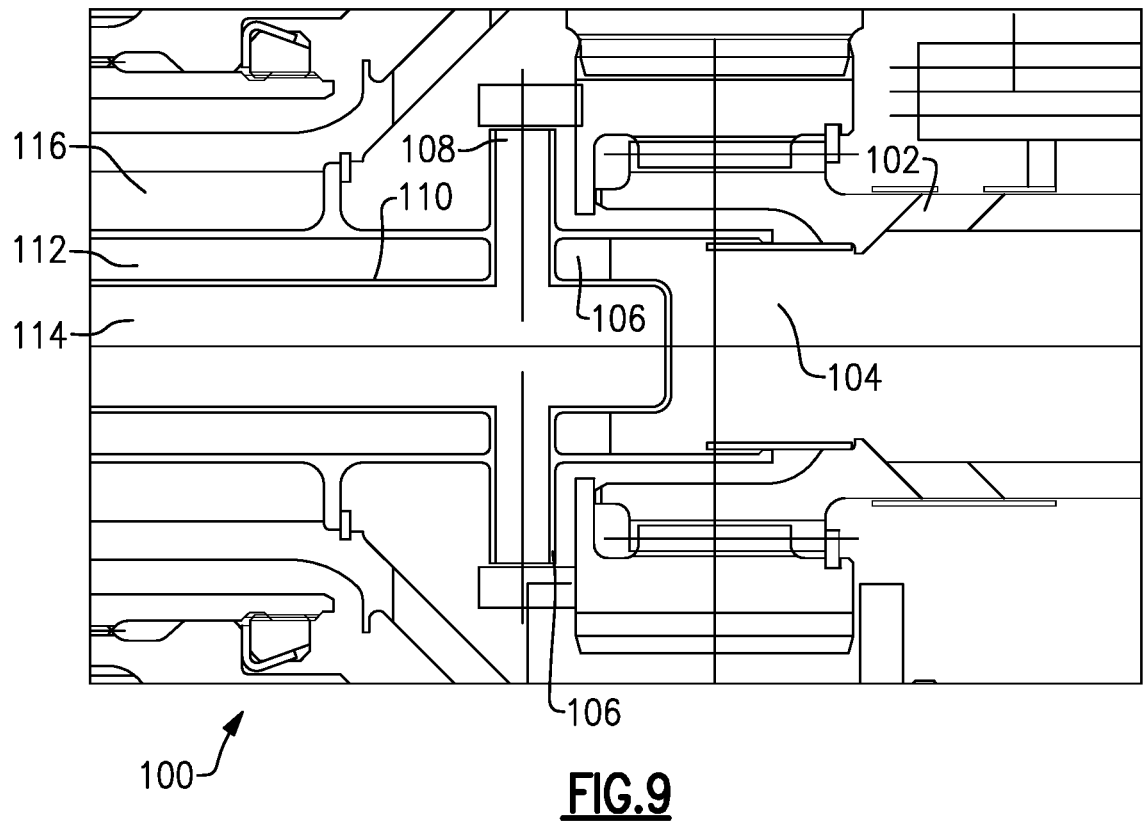
FIG. 9 shows a second embodiment.

FIG. 9 shows another embodiment 100. Here the oil scoop 102 delivers the oil and air mist into a chamber 104. Chamber 104 passes along to a chamber 106, and then around circumferentially spaced impellers 108 and into a mixed fluid chamber 112. The oil is thrown outwardly to chamber 116. The air moves from the chamber 112 downstream and then around into a chamber 114, and then is delivered outwardly of passages in the impellers 108.

Figure 10:
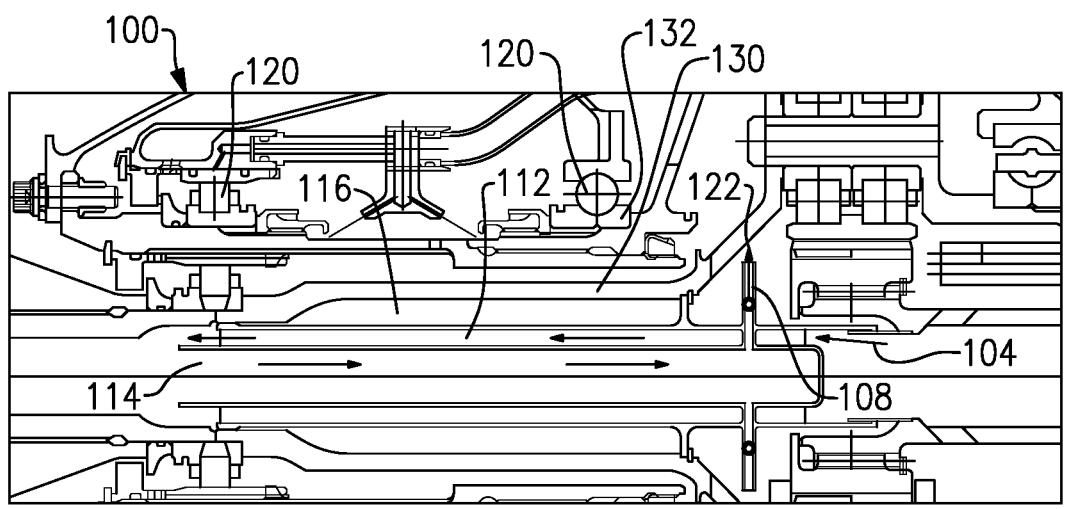
FIG. 10 shows further details of the FIG. 9 embodiment.

FIG. 10 shows further details of this flow and also the location of bearing 120. Here again the mixed air and oil mist rotates with the shaft such that the lubricant is thrown outwardly and the air is relatively free of lubricant when leaving the exits 122. The separated oil reaches chamber 116 such as through appropriate oil holes formed in the rotating member defining chamber 112. From chamber 116 the oil can pass through another rotating component 132, again through appropriate oil holes, and reach inner race 132.

A gas turbine engine 20 under this disclosure could be said to include a turbine for driving a shaft to in turn drive a rotor 30/36. A combustor 34 receives compressed air, and combusts the compressed air. The shaft 28/38 is supported by at least one bearing 52/120. An oil delivery system is associated with the at least one bearing and includes an oil scoop rotating with the shaft. An oil jet 54 is stationary and provided with a source of lubricant. A mixed fluid chamber 62/104 is within the shaft. The mixed fluid chamber 62/104 is connected to an air exit 70/122, and there further being an oil chamber 76/116 radially outward of the mixed fluid chamber. The oil chamber is connected to the at least one bearing 52/120.

In another embodiment according to the previous embodiment, the oil scoop 50 is axially spaced along an axis of rotation of the at least one shaft from the air exit 70 in a direction toward the at least one bearing.

In another embodiment according to any of the previous embodiments, there are a plurality of the oil scoops and the air exits that rotate with the at least one shaft.

In another embodiment according to any of the previous embodiments, the at least one shaft also rotates with a tie rod 75 which is radially inward of an inner peripheral surface of the at least one shaft and the mixed fluid chamber is defined between an inner peripheral surface of the at least one shaft and an outer peripheral surface of the tie rod.

In another embodiment according to any of the previous embodiments, the oil scoop has a cone 72 at an inner end such that oil in the oil chamber can move around the cone.

In another embodiment according to any of the previous embodiments, the oil scoop leads into a scoop chamber 62 having a cross-sectional area that decreases as it extends radially inwardly.

In another embodiment according to any of the previous embodiments, the air exit 70 increases in cross-sectional area from a radially inner end toward a radially outer end.

In another embodiment according to any of the previous embodiments, a plurality of circumferentially spaced impellers 108 rotate with the at least one shaft and include the air exit.

In another embodiment according to any of the previous embodiments, there are a plurality of the oil scoops and the air exits that rotate with the at least one shaft.

In another embodiment according to any of the previous embodiments, the at least one shaft also rotates with a tie rod 75 which is radially inward of an inner peripheral surface of the at least one shaft and the mixed fluid chamber is defined between an inner peripheral surface of the at least one shaft and an outer peripheral surface of the tie rod.

In another embodiment according to any of the previous embodiments, the oil scoop has a cone 72 at an end such that oil in the oil chamber can move around the cone, and remain separated from the fluid in the mixed fluid chamber.

In another embodiment according to any of the previous embodiments, the oil scoop leads into a scoop chamber 62 having a cross-sectional area that decreases as it extends radially inwardly.

In another embodiment according to any of the previous embodiments, the air exit 70 increases in cross-sectional area from a radially inner end toward a radially outer end.

In another embodiment according to any of the previous embodiments, wherein the at least one shaft also rotates with a tie rod 75 which is radially inward of an inner peripheral surface of the at least one shaft and the mixed fluid chamber is defined between an inner peripheral surface of the at least one shaft and an outer peripheral surface of the tie rod.

In another embodiment according to any of the previous embodiments, the oil scoop having a cone 72 at an end such that oil in the oil chamber can move around the cone, and remain separated from the fluid in the mixed fluid chamber.

In another embodiment according to any of the previous embodiments, the oil scoop leads into a scoop chamber 62 having a cross-sectional area that decreases as it extends radially inwardly.

In another embodiment according to any of the previous embodiments, the air exit 70 increases in cross-sectional area from a radially inner end toward a radially outer end.

In another embodiment according to any of the previous embodiments, the oil scoop has a cone 72 at an end such that oil in the oil chamber can move around the cone, and remain separated from the fluid in the mixed fluid chamber.

In another embodiment according to any of the previous embodiments, the oil scoop leads into a scoop chamber 62 having a cross-sectional area that decreases as it extends radially inwardly.

In another embodiment according to any of the previous embodiments, the air exit 70 increases in cross-sectional area from a radially inner end toward a radially outer end.

While a particular gas turbine engine is disclosed in FIG. 1, the teachings of this disclosure would extend to any other type of gas turbine engine.

Although embodiments have been disclosed, a worker of skill in this art would recognize that modifications would come within the scope of this disclosure. For that reason, the following claims should be studied to determine the true scope and content.

What is claimed is:

1. A gas turbine engine comprising:
a turbine for driving a shaft to in turn drive a rotor;
a combustor for receiving compressed air, and combusting the compressed air;
the shaft being supported by at least one bearing;
an oil delivery system associated with the at least one bearing and including an oil scoop rotating with the shaft and a stationary oil jet provided with a source of lubricant; and
a mixed fluid chamber within the shaft, the mixed fluid chamber being connected to an air exit, and there further being an oil chamber radially outward of the mixed fluid chamber, the oil chamber connected to the at least one bearing; and wherein the oil scoop is axially spaced along an axis of rotation of the shaft from the air exit in a direction toward the at least one bearing, and wherein the oil scoop has a cone at an end such that oil in the oil chamber can move around the cone, and remain separated from fluid in the mixed fluid chamber.

2. The gas turbine engine as set forth in claim 1, wherein there are a plurality of the oil scoops and the air exits that rotate with the shaft.

3. The gas turbine engine as set forth in claim 2, wherein the shaft also rotates with a tie rod which is radially inward of an inner peripheral surface of the shaft and the mixed fluid chamber being defined between the inner peripheral surface of the at least one shaft and an outer peripheral surface of the tie rod.

4. The gas turbine engine as set forth in claim 3, wherein each of the plurality of oil scoops leads into a scoop chamber having a cross-sectional area that decreases as the scoop chamber extends radially inwardly.

5. The gas turbine engine as set forth in claim 4, wherein each of the plurality of air exits increases in cross-sectional area from a radially inner end toward a radially outer end.

6. The gas turbine engine as set forth in claim 1, wherein a plurality of circumferentially spaced impellers rotate with the shaft and include the air exit.

7. The gas turbine engine as set forth in claim 1, wherein there are a plurality of the oil scoops and the air exits that rotate with the shaft.

8. The gas turbine engine as set forth in claim 7, wherein the shaft also rotates with a tie rod which is radially inward of an inner peripheral surface of the shaft and the mixed fluid chamber being defined between the inner peripheral surface of the shaft and an outer peripheral surface of the tie rod.

9. The gas turbine engine as set forth in claim 8, wherein each of the plurality of oil scoops leads into a scoop chamber having a cross-sectional area that decreases as the scoop chamber extends radially inwardly.

10. The gas turbine engine as set forth in claim 9, wherein each of the plurality of air exit increases in cross-sectional area from a radially inner end toward a radially outer end.

11. The gas turbine engine as set forth in claim 1, wherein the oil scoop leads into a scoop chamber having a cross-sectional area that decreases as the scoop chamber extends radially inwardly.

12. The gas turbine engine as set forth in claim 1, wherein the air exit increases in cross-sectional area from a radially inner end toward a radially outer end.

13. A gas turbine engine comprising:
a turbine for driving a shaft to in turn drive a rotor;
a combustor for receiving compressed air, and combusting the compressed air;
the shaft being supported by at least one bearing;
an oil delivery system associated with the at least one bearing and including an oil scoop rotating with the shaft and a stationary oil jet provided with a source of lubricant;
a mixed fluid chamber within the shaft, the mixed fluid chamber being connected to an air exit, and there further being an oil chamber radially outward of the mixed fluid chamber, the oil chamber connected to the at least one bearing; and
wherein the shaft also rotates with a tie rod which is radially inward of an inner peripheral surface of the shaft and the mixed fluid chamber being defined between the inner peripheral surface of the shaft and an outer peripheral surface of the tie rod.

14. The gas turbine engine as set forth in claim 13, wherein the oil scoop has a cone at an end such that oil in the oil chamber can move around the cone, and remain separated from the fluid in the mixed fluid chamber.

15. The gas turbine engine as set forth in claim 14, wherein the oil scoop leading into a scoop chamber having a cross-sectional area that decreases as the scoop chamber extends radially inwardly.

16. The gas turbine engine as set forth in claim 15, wherein the air exit increases in cross-sectional area from a radially inner end toward a radially outer end.

17. A gas turbine engine comprising:
a turbine for driving a shaft to in turn drive a rotor;
a combustor for receiving compressed air, and combusting the compressed air;
the shaft being supported by at least one bearing;
an oil delivery system associated with the at least one bearing and including an oil scoop rotating with the shaft and a stationary oil jet provided with a source of lubricant; and
a mixed fluid chamber within the shaft, the mixed fluid chamber being connected to an air exit, and there further being an oil chamber radially outward of the mixed fluid chamber, the oil chamber connected to the at least one bearing, with said air exit being spaced away from said oil scoop such that the air mixed with lubricant moves into the mixed fluid chamber prior to the mixed fluid reaching the air exit;
wherein each of the plurality of oil scoops leads into a scoop chamber having a cross-sectional area that decreases as the scoop chamber extends radially inwardly; and
wherein each of the plurality of air exit increase in cross-sectional area from a radially inner end toward a radially outer end, and wherein each of the plurality of oil scoops has a cone at an end such that oil in the oil chamber can move around the cone, and remain separated from fluid in the mixed fluid chamber.

* * * * *